US009256726B2

United States Patent
Ordille et al.

(10) Patent No.: US 9,256,726 B2
(45) Date of Patent: Feb. 9, 2016

(54) CALL CENTER CUSTOMER SERVICE KIOSK

(71) Applicant: Avaya Inc., Santa Clara, CA (US)

(72) Inventors: Joann Ordille, Lebanon, NJ (US); Anjur Sundaresan Krishnakumar, Princeton, NJ (US); Shalini Yajnik, Berkeley Heights, NJ (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/309,515

(22) Filed: Jun. 19, 2014

(65) Prior Publication Data

US 2015/0237207 A1    Aug. 20, 2015

Related U.S. Application Data

(60) Provisional application No. 61/941,924, filed on Feb. 19, 2014.

(51) Int. Cl.

| | |
|---|---|
| *H04M 3/42* | (2006.01) |
| *G06Q 30/00* | (2012.01) |
| *G06F 21/45* | (2013.01) |
| *H04M 1/725* | (2006.01) |
| *H04M 3/51* | (2006.01) |
| *H04M 3/54* | (2006.01) |
| *H04M 3/58* | (2006.01) |
| *H04W 4/00* | (2009.01) |
| *H04W 4/16* | (2009.01) |

(52) U.S. Cl.
CPC ........... *G06F 21/45* (2013.01); *H04M 1/72525* (2013.01); *H04M 3/5183* (2013.01); *H04M 3/54* (2013.01); *H04M 3/58* (2013.01); *H04W 4/008* (2013.01); *H04W 4/16* (2013.01)

(58) Field of Classification Search
CPC ................. H04M 15/8033; H04M 2215/0184; H04M 2215/7435; H04M 2242/30; H04M 2250/04; H04M 2242/40
USPC ............... 379/204.01, 201.1, 201.01, 201.06, 379/212.01; 705/2, 14.37, 14.36; 726/3
See application file for complete search history.

(56) References Cited

U.S. PATENT DOCUMENTS

| | | | | |
|---|---|---|---|---|
| 8,874,467 | B2 * | 10/2014 | Yahn et al. ................. | 705/14.37 |
| 2013/0212286 | A1 | 8/2013 | Krishnakumar et al. | |
| 2014/0052458 | A1 * | 2/2014 | Ghazvini et al. ................. | 705/2 |
| 2014/0061292 | A1 * | 3/2014 | Meyers et al. ................. | 235/375 |
| 2014/0208384 | A1 * | 7/2014 | Youssefian et al. ................ | 726/3 |

\* cited by examiner

*Primary Examiner* — Thjuan K Addy
(74) *Attorney, Agent, or Firm* — Sheridan Ross P.C.

(57) ABSTRACT

A customer uses an in store kiosk to establish a communication session, such as a video communication session between the kiosk and an agent in a contact center. The customer can transfer the communication session to the customer's personal mobile communication device by selecting to transfer the communication session at the kiosk. A presence of the customer's personal mobile communication device is detected. The presence of the customer's personal mobile communication device can be detected by the use of various technologies, such as Near Field Communications or scanning a code on the kiosk from the mobile communication device. In response to detecting the presence of the mobile communication device the communication session is transferred from the kiosk to the mobile communication device using a communication application in the mobile communication device.

20 Claims, 4 Drawing Sheets

CALL CENTER CUSTOMER SERVICE KIOSK

CROSS REFERENCE TO RELATED APPLICATIONS

This application claims the benefit under 35 U.S.C. §119 (e) of U.S. Provisional Application No. 61/941,924, filed Feb. 19, 2014, entitled "CUSTOMER SERVICE KIOSK FOR BYOD" the entire disclosure of which is incorporated herein by reference.

TECHNICAL FIELD

The systems and methods disclosed herein relate to contact centers and in particular to customer service contact centers.

BACKGROUND

Kiosks allow companies to provide personal in-store service to customers through contact with remote agents in a contact center. These types of kiosks can improve customer service, reduce the demand on local staff, and can provide expertise that is not present locally. However, a problem with kiosks is that a customer is tied to the location of the kiosk. This can result in situations where high quality of service cannot always be obtained.

For example, being tethered to the kiosk prevents a customer from conversing with a contact center agent while going to another location in a store that may have a specific product or service in which the customer is interested. Another problem is that long lines can form at the kiosk. These long lines can result in poor customer satisfaction if a user has to wait for a long period of time to use the kiosk. Another problem is that the kiosk may not afford the privacy necessary to comfortably complete the interaction with the contact center agent. These and other deficiencies still limit the usefulness of a kiosk.

SUMMARY

Systems and methods are provided to solve these and other problems and disadvantages of the prior art. A customer uses a kiosk, such as an in-store kiosk, to establish a communication session, such as a video communication session between the kiosk and an agent in a contact center. The contact center can be co-located with or remote from the store in which the kiosk is situated. The customer can transfer the communication session to the customer's personal mobile communication device by selecting to transfer the communication session at the kiosk (e.g., by selecting a transfer option presented to the customer via a Graphical User interface (GUI) of the kiosk). A presence of the customer's personal mobile communication device is detected at or in proximity with the kiosk. The presence of the customer's personal mobile communication device can be detected by the use of various technologies, such as Near Field Communications (NFC), Bluetooth®, or scanning a code on the kiosk with a camera or similar image-based input of the mobile communication device. In response to detecting the presence of the mobile communication device by scanning a Quick Response (QR) code, session information and the URL of a server are used to download code on the mobile device to transfer the communication session. The communication session is then transferred from the kiosk to the mobile communication device using the communication application. This allows the customer to continue the communication session while walking through the store.

DETAILED DESCRIPTION

Figure 1:
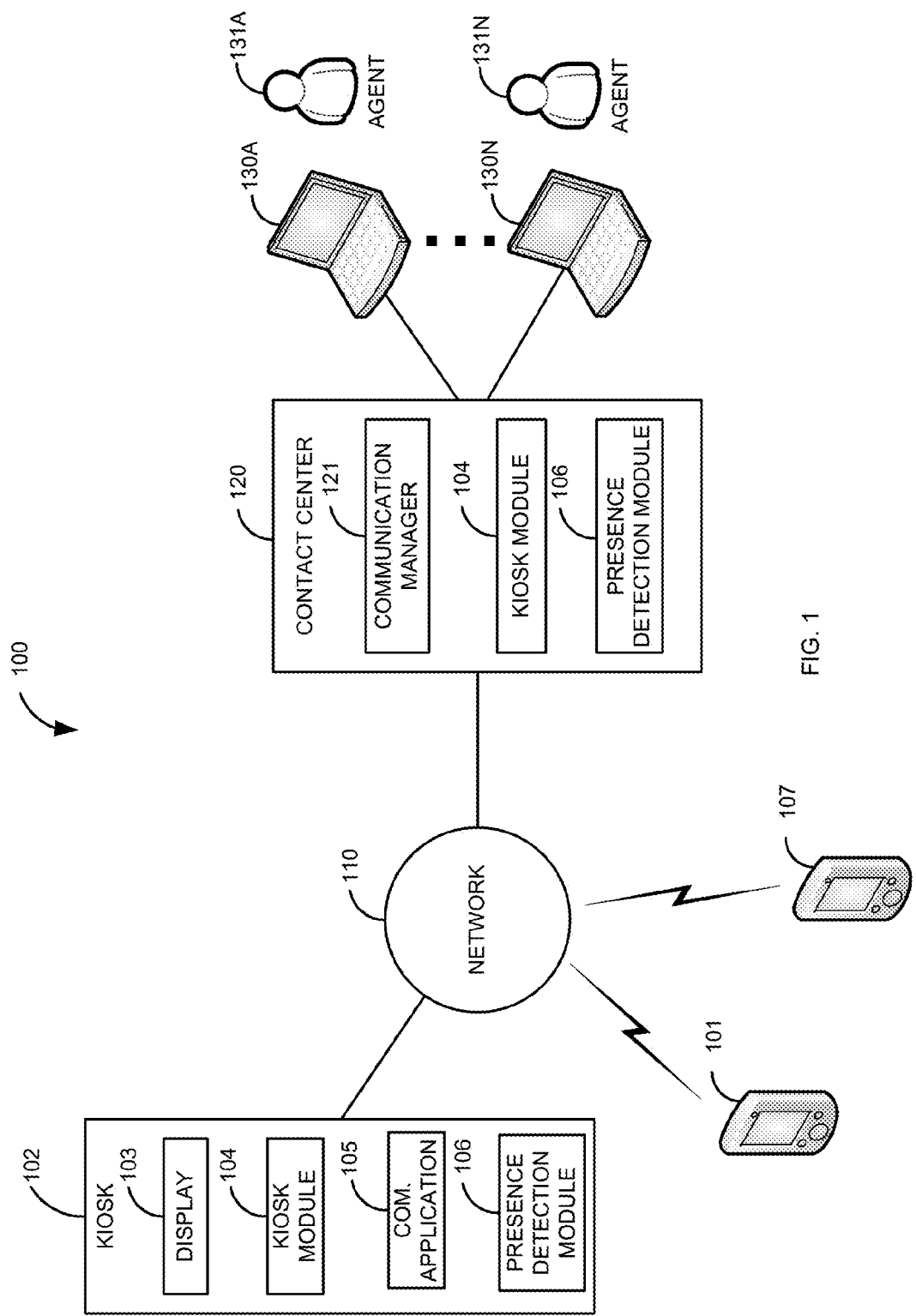
FIG. 1 is a block diagram of a first illustrative system for providing contact center kiosk services.

FIG. 1 is a block diagram of a first illustrative system 100 for providing contact center kiosk services. The first illustrative system 100 comprises a mobile communication device 101, a kiosk 102, an employee mobile communication device 107, a network 110, a contact center 120, agent terminals 130A-130N and agents 131A-131N.

The mobile communication device 101 can be or may include any mobile device that can communicate on the network 110, such as a Personal Computer (PC), a mobile telephone, a mobile video device, a cellular telephone, a Personal Digital Assistant (PDA), a tablet device, a notebook device, a smart phone, a smart watch, and the like. The mobile communication device 101 can communicate with the network using a variety of protocols. The mobile communication device 101 may be a customer's personal mobile communication device 101, a mobile communication device 101 of another person, a mobile communication device 101 that is owned by a company (e.g., a company that owns a store where the kiosk 102 is located), and the like.

The employee mobile communication device 107 can be or may include any mobile communication device that can communicate on the network 110. For example, the employee mobile communication device 107 may be the same or similar to the mobile communication device 101.

The kiosk 102 can be or may include any device that can provide interactive communication, such as an interactive computer terminal, a personal computer, an automated teller, a computing system, and/or the like. The kiosk 102 can provide a variety of services, such as in-store services, customer services, direction services, automated teller services, product services, and/or the like. The kiosk 102 further comprises a display 103, a kiosk module 104, a communication application 105, and a presence detection module 106.

The display 103 can be or may include any type of display, such as a touch screen, a Light Emitting Diode (LED) display, a plasma display, a Cathode Ray Tube (CRT), and/or the like. The display 103 can be used to provide outputs (e.g., visual outputs) in addition to providing a location for user input (e.g., via a touch-sensitive display). The display 103 can alternatively or additionally be used in conjunction with a separate input device, such as a mouse or keyboard.

The kiosk module 104 can be or may include any hardware/software that manages operations of the kiosk 102. Depending on implementation, the kiosk module 104 may be only in the kiosk 102, may be distributed between the kiosk 102 and the contact center 120, or may be solely in the contact center 120.

The communication application 105 can be any software (e.g., instructions stored in a non-transitory computer-readable memory) that can be downloaded onto the mobile communication device 101 to allow for transferring a communication session from the kiosk to the mobile communication device 101. In FIG. 1, the communication application 105 is shown as being stored in the kiosk 102. However, in other embodiments, the communication application 105 may be stored in and downloaded from the contact center 120 or from some other remote server connected to the network 110.

The presence detection module 106 can be or may include any hardware/software that can determine that the mobile device 101 is within a predefined proximity of the kiosk. For example, the presence detection module 106 can be a Radio Frequency Identification (RFID) detector, a Near Field Communication (NFC) detector, a Bluetooth® detector, a software module to handling Quick Response (QR) codes that are scanned by the mobile communication device 101, a software module for managing other types of scanned codes, identifiers, Radio Frequency Identification (RFID) tags, or serial numbers, and/or the like. The presence detection module 106, in one embodiment is in the contact center 102 or distributed between the contact center 120 and the kiosk 102. For example, the presence detection module 106 may be on a back-end server that supports a URL that is indicated in a QR code. In FIG. 1, the presence detection module 106 is shown as part of the contact center 106. However, the presence detection module 106 may be on a back-end server that is separate from the contact center 120.

The network 110 can be or may include any collection of communication equipment that can send and receive electronic information, such as the Internet, a Wide Area Network (WAN), a Local Area Network (LAN), a Voice over IP Network (VoIP), the Public Switched Telephone Network (PSTN), a packet switched network, a circuit switched network, a cellular network, a WiFi network, an 802.11 network, a combination of these, and the like. The network 110 can use a variety of protocols, such as Ethernet, Internet Protocol (IP), Session Initiation Protocol (SIP), H.323, Integrated Services Digital Network (ISDN), 802.11, and the like.

The contact center 120 can be or may include any hardware/software that can manage communications. The contact center 120 can support a variety of communication sessions between agents 131A-N and customers/users, such as an audio communication session, a video communication session, a multimedia communication session, a text communication session, an Instant Messaging communication session, an email communication session, and/or the like. The contact center 120 further comprises a communication manager 121 and the kiosk module 104.

The communication manager 121 can be or may include any hardware/software that can manage communication sessions, such as a session manager, a Private Branch Exchange (PBX), a central office switch, a router, a video switch, an Instant Messaging Server, an email server, a combination of these, and the like. The communication manager 121, in some embodiments, may be distributed between the contact center 120 and the kiosk 102. The communication manager 121 may also be distributed between public and private networks. In addition, all non-kiosk software can exist in the cloud.

The agent terminals 130A-130N can be any type of communication device that may be used by the contact center agents 131A-131N, such as a personal computer, a notebook device, a terminal, a laptop computer, a tablet device, a smart phone, a Personal Digital Assistant (PDA), and/or the like. In this example, the contact center 120 may have any number of agent terminals 130. Likewise, the contact center 120 may have any number of agents 131A-131N. The contact center agents 131A-131N can use the agent terminals 130A-130N as part of a communication session between the kiosk 102, the mobile communication device 101, and the contact center 120.

Figure 2:
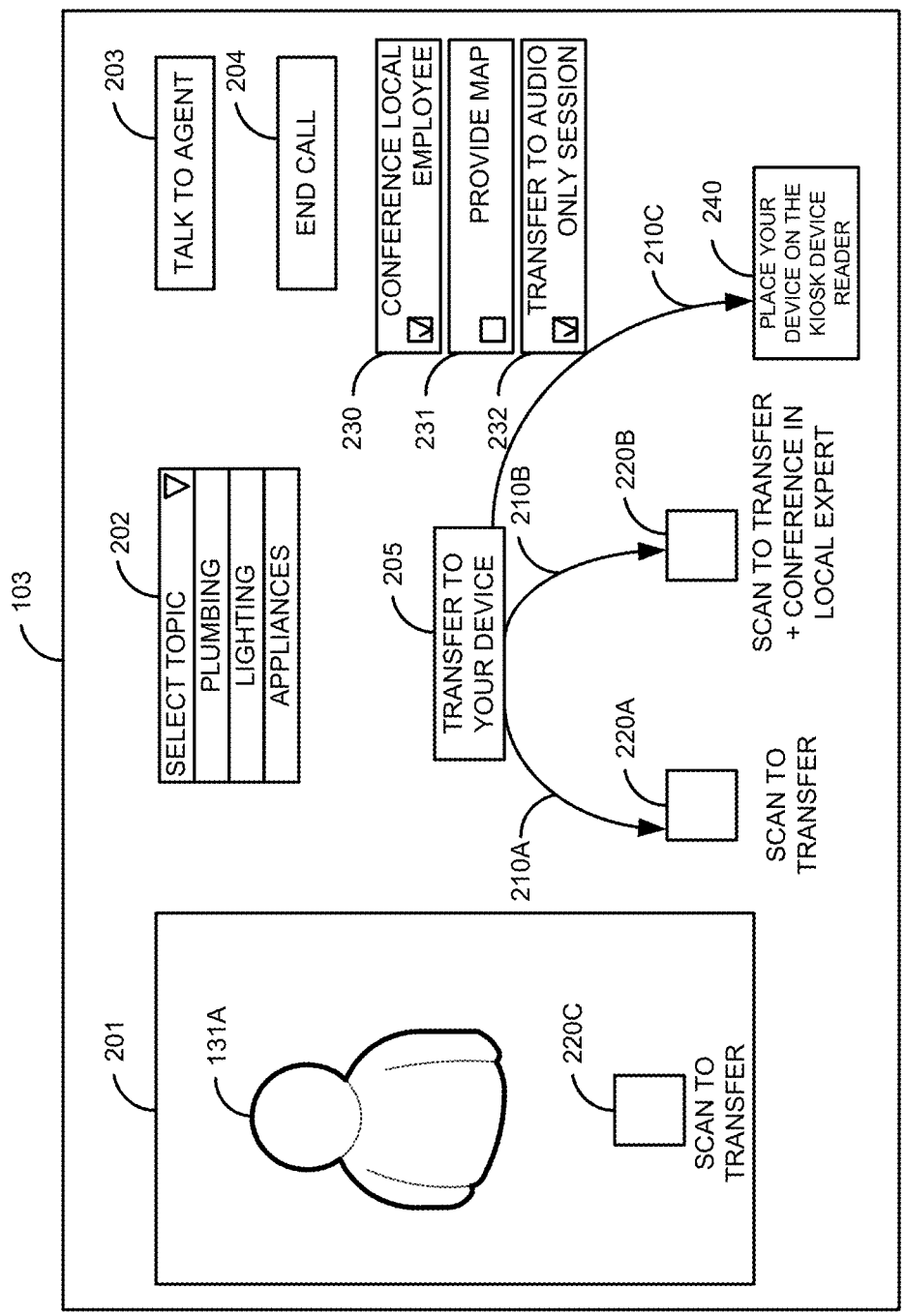
FIG. 2 is diagram of an exemplary kiosk display.

A communication session is established, by way of example, between the kiosk 102 and the agent 131A (via agent terminal 130A) by the communication manger 121. The communication session can be any type of communication session, such as an audio communication session, a video communication session, a multimedia communication session, an Instant Messaging communication session, a text communication session, and/or the like. For example, a customer/user at the kiosk 102 may select a "talk to agent button" (e.g., as shown in FIG. 2, element 203) on the kiosk 102 to establish a video communication session with the contact center agent 131A. The customer/user can be any one who uses the kiosk 102 to contact the contact center 120.

The communication manager 121, in some embodiments, determines that the communication session exists between the contact center 120 and the kiosk 102 based on a kiosk identifier. The kiosk identifier can be any identifier that uniquely identifies (e.g., globally or within the environment of the contact center 120) the kiosk 102, such as a telephone number, a globally unique identifier, an IP address, a network address, an Ethernet address, a Media Access Control (MAC) address, and/or the like. The kiosk identifier may be identified or created by the communication manager 121 as part of establishing the communication session between the kiosk 102 and agent 131A. Alternatively, the kiosk identifier may be determined when the kiosk identifier is sent as part of a transfer request or looked up in a database based on a caller identifier.

A customer/user at the kiosk 102 indicates that the customer/user wants to transfer the communication session from the kiosk 102 to a mobile communication device 101. Of course, other situations may involve an on-site customer service representative indicating that the communication session is to be transferred from the kiosk 102 to a mobile device 101 of the customer and/or a mobile device 107 of the on-site local employee 107. For example, the customer/user can select a "transfer to your device" button (e.g., as shown in FIG. 2, element 205) to transfer the communication session with the contact center agent 131A from the kiosk 102 the customer's personal mobile communication device 101.

The kiosk module 104, in response to receiving the request to transfer, detects the presence of the mobile communication device 101 at or in proximity with the kiosk 102. The kiosk module 104 can detect the presence of the mobile communication device 101 in various ways. The kiosk module 104 can detect the presence of the mobile communication device 101 using Near Field Communication (NFC), Bluetooth®, Radio proximity based communications using Radio Frequency Identification (RFID) tags, and/or the like. For example, the customer, upon selecting to transfer the communication session from the kiosk 102 to the mobile communication device 101, may be displayed a message to place their NFC enabled mobile communication device 101 next to a NFC detector (presence detection module 106) to detect the presence of the mobile communication device 101 in proximity to the kiosk 102.

The use of Bluetooth® and NFC are capable of two way detection. The presence detection module 106 at the kiosk 102 detects the presence of the mobile communication device 101. The mobile communication device 101 is also aware of the presence of the Kiosk 102. In the case of technologies such as RFID, the mobile communication device 101 will have to have the communication application 105 that communicates with the presence detection module 106 in the kiosk 102.

In another embodiment, the presence detection module 106 can detect the presence of the mobile communication device 101 when the customer scans a code displayed in the display 103 of the kiosk 102. In this embodiment, the presence detection module 106 would be on a back-end server that is pointed to by a URL in the QR code (e.g., the presence detection module 106 in the contact center). The code can be Quick Response code (QR code), a bar code, a serial number, a RFID tag, a combination of these, and the like. For example, when the customer selects to transfer the communication session from the kiosk 102 to the mobile communication device 101, a QR code is displayed to the customer on the kiosk 102. The customer then scans the QR code via a scanner/camera in the mobile communication device 101.

Scanning the QR code associated with the kiosk 102 allows the presence detection module 106 in the contact center 120 to communicate with the with the mobile communication device 101. Scanning the QR code registers the mobile communication device 101 with presence detection module 106. This can be accomplished in various ways, such as based on a Universal Resource Locator (URL) designated by the QR code. When the QR code is scanned, the mobile device's browser goes to the URL indicated by the QR code. The URL starts a communication with the presence module 106 in the contact center 120. Code from the URL is executed in the mobile communication device's browser. If the communication application 105 is not present, the mobile communication application 105 is downloaded and installed on the mobile communication device 101. The communication application 105 interacts with the kiosk module 104 in the contact center 120 to get the session information in order to transfer the communication session.

In response to detecting the presence of the mobile communication device 101, the kiosk module 104 (or some other device) determines if the communication application 105 needs to be downloaded onto the mobile communication device 101 (if not downloaded previously). Downloading the download communication application 105 can be accomplished in various ways, such as via a local WiFi network, via a Bluetooth connection, via NFC, via the Internet, via a cellular network, via the Public Switched Telephone Network (PSTN), and/or the like. Once the communication application 105 has been downloaded to the mobile communication device 101, the communication session is transferred from the kiosk 102 to the mobile communication device 101. Since the mobile communication device 101 has been registered with the kiosk module 104, the communication manager 121 can now transfer the communication session from the kiosk 102 to the mobile communication device 101 using the communication application 105 on the mobile communication device 101. For example, the call can be transferred via a local WiFi in a store to the mobile communication device 101. The transfer can be implemented in various ways, such as using Session Initiation Protocol (SIP) to download the application to the communication device. In this embodiment, since the communication is a local communication on a local WiFi network (not a cellular call), the telephone number of the mobile communication device does not have to be known. Similarly, using the cellular data network, instead of the WiFi does not require the telephone number to be known.

In another embodiment, the communication application 105 can send a telephone number of the mobile communication device 101 to the kiosk module 104. For example, the communication application 105 may query the customer for the telephone number of the mobile communication device 101, may automatically get the telephone number of the mobile communication device 101 (e.g., by the communication application 105 getting the mobile communication device 101 telephone number), may get the telephone number of the mobile communication device 101 based on the customer's approval, and the like. Once the telephone number of the mobile communication device 101 has been received by the kiosk module 104, the communication manager 121 can transfer the communication session to the communication device via a cellular network (e.g., a cellular network via the PSTN).

Since the mobile communication device 101 has been registered with the kiosk module 104, when the communication session is transferred to the mobile communication device 101, a single communication record is maintained in the contact center 120 for the entire communication session (including the transfer). This is a substantial improvement over existing systems that create two session records (one session record for the communication session between the contact center 120 and the kiosk 102 and a second session record for the call between the call center 120 and the communication device 102).

In one embodiment, once the communication session between the contact center 120 and the mobile communication device 101 has ended, the communication application 105 that was downloaded to the mobile communication device 101 is deleted. Before deletion, the customer may be asked if he/she would like to share contact information with the contact center 120.

In one embodiment, instead of transferring the communication session to a mobile communication device 101 of the customer, the communication session is transferred to the mobile device 107 of a local employee. This way the local employee can assist the customer by walking around the store with the customer while conversing with the agent 131A in the contact center 120.

FIG. 2 is diagram of an illustrative kiosk display 103. The illustrative kiosk display 103 describes various options that may be displayed to a customer. The kiosk display 103 comprises a communication session window 201, a topic menu 202, a talk to agent button 203, an end call button 204, a transfer to your device button 205, codes 220A-220C, a conference local employee check box 230, a provide map check box 231, a transfer to audio only check box 232, and an instruction window 240. The codes 220A-220C can be a QR code, a bar code, an identification number, a serial number, an RFID tag, and the like. The kiosk display 103 will typically be a touch screen that allows the customer to select the topic menu 202, the buttons 203-204, and the check boxes 230-232.

The customer, at the kiosk 102, initiates a video communication session with the contact center 120 by selecting the talk to agent button 203. The customer is connected with the contact center agent 131A as depicted in the communication session window 201. During the video communication session with the contact center agent 131A, the customer decides to transfer the video communication session with the contact center agent 131A.

In one embodiment, the contact center agent 131A determines that it may make sense to transfer the call to the customer's mobile communication device 101. For example, the agent may decide that it would be best to have the customer walk to a specific area in a store to further discuss a specific product. Based on this input from the agent, the code 220C is displayed in the communication session window 201 (sent as part of the video stream). In this example, the code 220A is QR code. The customer can then scan the code 220C to download the communication application 105 and transfer the video communication session from the kiosk 102 to the mobile communication device 101. The customer then continues the video communication session with the agent 131A on the mobile communication device 101. Alternatively, the QR code could be sent separate from the video stream.

In another embodiment, the customer selects the transfer to your device button 205. In response to the selection of the transfer to your device button 205, the kiosk module 104 displays in step 210A the code 220A. The customer then scans the code 220A to download the communication application 105 (if necessary) and transfer the video communication session from the kiosk 102 to the mobile communication device 101.

In another embodiment, based on the selection of a specific topic from the topic menu 202, when the customer selects the transfer to your device button 205, both the codes 220A and 220B are displayed in steps 210A and 210B. If the customer wants to conference in a local expert on the selected topic, the customer can scan the code 220B associated with the selected topic to download the communication application 105 (if necessary); the video communication session is then transferred from the kiosk to the mobile communication device 101 with the local expert conferenced into video communication session. The local expert may be conference in using video/audio or audio only (or even text only).

In another embodiment, based on the selection of the transfer to your device button 205, the instruction window 240 is displayed to the customer. The instruction window 240 instructs the customer to place their mobile communication device 101 on the kiosk device reader (the presence detection module 106). The customer places their mobile communication device 101 on the kiosk device reader. The kiosk code reader detects the presence of the mobile communication device 101 in proximity to the kiosk 102, using NFC (or another protocol). In response to detecting the presence of the mobile communication device 101, the communication application 105 is downloaded onto the mobile communication device 101 (if necessary) and the video communication session is transferred from the kiosk 102 to the mobile communication device 101.

In another embodiment, the customer can select various options that are available as part of transferring the communication session. The customer can select options using the topic menu 202, the conference local employee check box 230, the provide map check box 231, and the transfer to audio only check box 232. For example, the customer could select the plumbing topic, the conference local employee check box 230, and the transfer to audio only check box 232 to transfer the video communication session to an audio communication session where a local subject expert on plumbing is conferenced into the audio call. In one embodiment, a single QR code is displayed that provides all the selected options when scanned. Alternatively, the customer could select the options and then be provided the instructions window 240 to transfer the call with the customer selected options by placing their device on the kiosk device reader.

In one embodiment, the options are provided via a pop-up window based on the selection of the transfer to your device button 205. In another embedment, the options can be presented after the communication session has been transferred. Other options could be to transfer a video communication session to an Instant Messaging communication session, conferencing in the contact center agent's supervisor, and/or the like.

Figure 3:
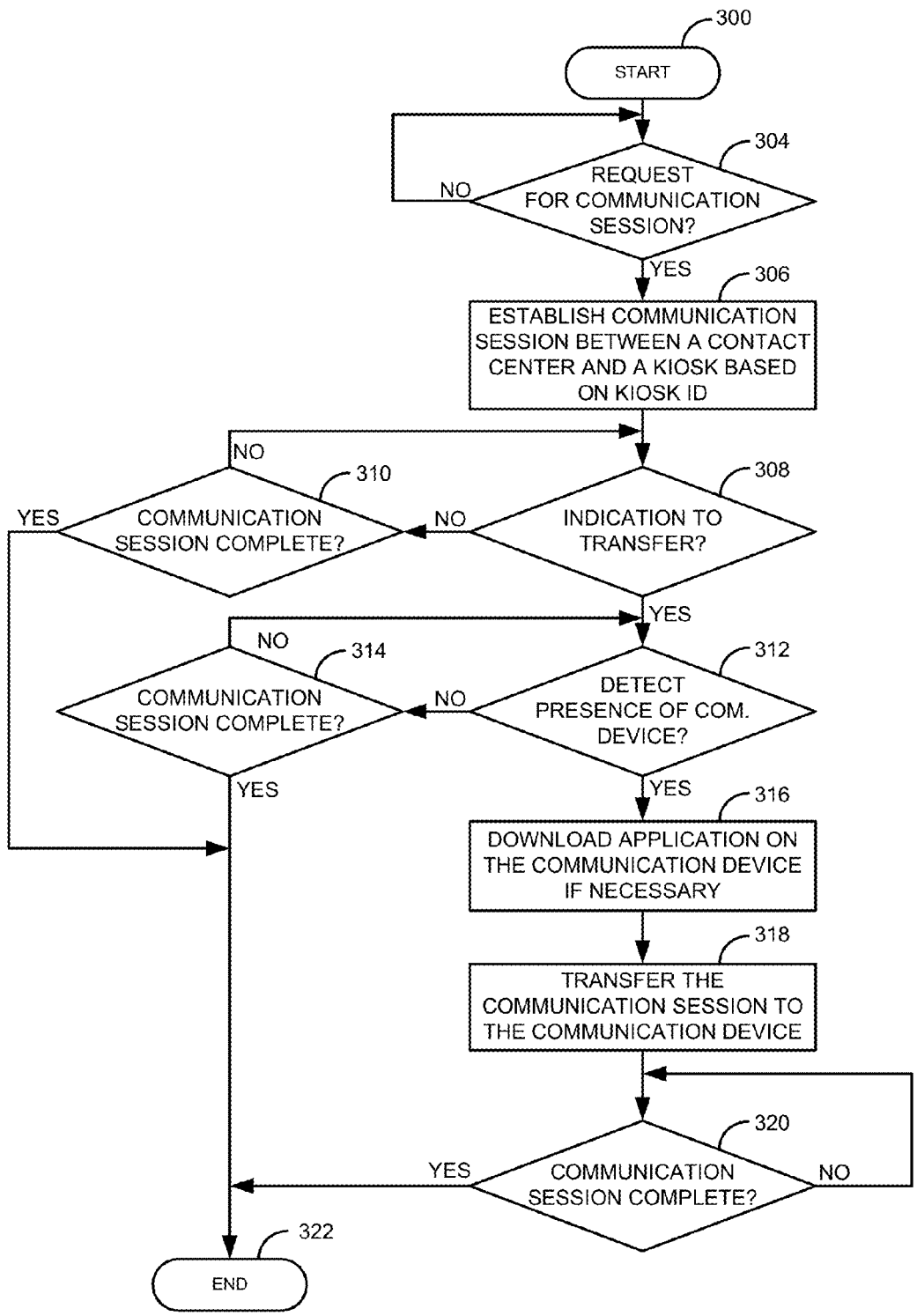
FIG. 3 is a flow diagram of a process for providing contact center kiosk services.
Figure 4:
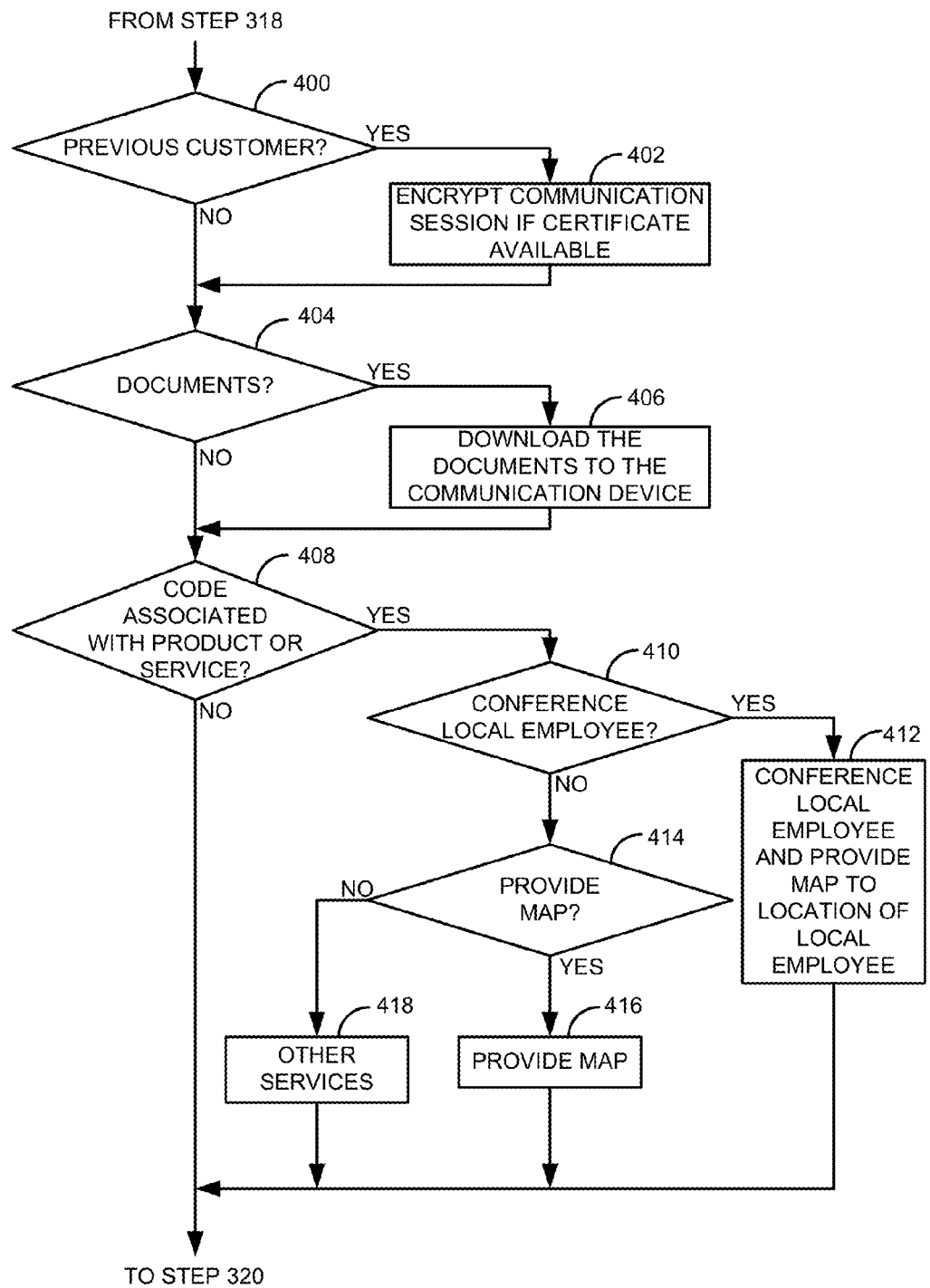
FIG. 4 is a flow diagram of a process for additional contact center kiosk services.

FIG. 3 is a flow diagram of a process for providing contact center services. Illustratively, the mobile communication device 101, the kiosk 102, the display 103, the kiosk module 104, the communication application 105, the presence detection module 106, the employee mobile communication device 107, the contact center 120, the communication manager 121, and the agent terminals 130A-130N are stored-program-controlled entities, such as a computer or processor, which performs the method of FIGS. 3-4 and the processes described herein by executing program instructions stored in a tangible computer readable storage medium, such as a memory or disk. Although the methods described in FIGS. 3-4 are shown in a specific order, one of skill in the art would recognize that the steps in FIGS. 3-4 may be implemented in different orders and/or be implemented in a multi-threaded environment. Moreover, various steps may be omitted or added based on implementation.

The process starts in step 300. The process waits in step 304 for a request for a communication session. If a request is not received in step 304, the process repeats step 304. Otherwise, if a request for a communication session is received in step 304, the process establishes a communication session between a contact center and a kiosk based on a kiosk identifier in step 306. In particular, a communication session may be established between a kiosk and one or more agent terminals 130A-130N, depending upon whether the communication session is a two-person session or a conference.

The process determines in step 308 if an indication is received that the customer/user wants to transfer the communication session from the kiosk to the mobile communication device. If an indication has not been received in step 308, the process goes to step 310. The process determines in step 310 if the communication session is complete. If the communication session is complete in step 310, the process ends in step 322. Otherwise, if the communication session is not complete in step 310, the process goes back to step 308.

If the indication to transfer the communication session from the kiosk to the mobile communication device is received in step 308, the process determines in step 312 if a presence of the mobile communication device has been detected in proximity to the kiosk. If a presence of the mobile communication device is not detected in step 312, the process goes to step 314. The process determines in step 314 if the communication session is complete. If the communication session is complete in step 314, the process ends in step 322. Otherwise, if the communication session is not complete in step 314, the process goes to step 312.

If the process detects the presence of the mobile communication device in proximity to the kiosk in step 312, the process downloads the communication application (if necessary) to the mobile communication device in step 316. The process transfers the communication session from the kiosk to the mobile communication device in step 318. The process determines in step 320 if the communication session is complete. If the communication session is not complete in step 320, the process repeats step 320. Otherwise, if the process is complete in step 320, the process ends in step 322.

FIG. 4 is a flow diagram of a process for additional contact center services. The process of FIG. 4 is an exemplary embodiment that goes between steps 318 and 320 of FIG. 3. As part starting transferring the communication session to the mobile communication device in step 318, the process determines if the customer is a previous customer of the contact center in step 400. The process can determine that the customer is a previous customer of the contact center based on information entered by the customer at the kiosk, based on an identifier supplied via an Interactive Voice Response (IVR) system when calling from the kiosk, via a swiped card, via a swiped credit card number, and/or the like. If the customer is not a previous customer of the contact center in step 400, the process goes to step 404. Otherwise, if the customer is a previous customer in step 400 the process can optionally encrypt the communication session if a digital certificate is available. For example, the customer may have exchanged a digital certificate when previously calling into the contact center. The previously exchanged digital certificate can be used to encrypt the transferred communication session from the contact center to the mobile communication device. The process then goes to step 404.

If the customer is a new customer, the communication session can still be encrypted by generating a new digital certificate. The newly generated digital certificate can be used to encrypt the communication session. The digital certificate can then be associated with the customer for future use.

The process determines in step 404 if a document(s) was downloaded to the kiosk for viewing by the customer. For example, if the customer was looking for specifications for a particular type of appliance, a manual for the appliance can be downloaded to the kiosk so that the customer can search through the manual. If a document was not downloaded in step 404, the process goes to step 408. Otherwise, if a document(s) was downloaded to the kiosk in step 404, the process downloads the document(s) to the mobile communication device for display to the customer in step 406. The process then goes to step 408.

The process determines in step 408 if the scanned code is associated with a product or service. For example, the customer may have associated the scanned code with a delivery service for an appliance that the customer was looking to purchase. If the scanned code is not associated with a product or service in step 408, the process goes to step 320.

Otherwise, if the code is associated with a product or service in step 408, the process determines if the code also indicated to conference in a local employee in step 410. If the code indicated to conference in a local employee in step 410, the process conferences in the local employee in step 412. The process may also provide a map to the location of the local employee. For example, the map could provide directions from the kiosk to a help desk where the local employee is located. Alternatively, the process may provide a map to the desired product. The process then goes to step 320.

In one embodiment, the local employee may be conferenced in even if the code is not associated with a product or service. For example, the customer could select the conference local employee check box 230 without selecting the topic menu 202 as described in FIG. 2.

If the code does not indicate to conference in a local employee in step 410, the process determines whether to provide a map in step 414. If a map is to be provided in step 416, the map is provided to the customer in step 416 and the process goes to step 320. Otherwise, if a map was not to be provided in step 414, other services may be provided to the customer in step 418. For example, other services can be provided, such as downloading a service application to the customer's mobile communication device, providing locations of other stores, providing location of other stores that carry an out of stock item, and/or the like. The process then goes to step 320.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
receiving, by a processor, an indication that a user of a kiosk wants to transfer a communication session, between an agent terminal of a contact center and the kiosk, from the kiosk to a mobile communication device;
receiving, by the processor, an indication that a customer has scanned a code on the kiosk that is one of: a Quick Response Code (QRCode), a bar code, a Radio Frequency Identifier (RFID), a scanned code, or a serial number;
in response to receiving the indication that the customer has scanned the code on the kiosk, transferring, by the processor, the communication session from the kiosk to the mobile communication device;
determining, by the processor, that the code is associated with a specific type of product or service provided by a store; and
in response to determining that the code is associated with the specific type of product or service provided by the store, providing a map that identifies a location in the store where the customer can find the specific type of product or service.

2. The method of claim 1, further comprising:
determining if the mobile communication device needs to download a communication application; and
in response to determining that the mobile communication device needs to download the communication application, downloading the communication application on the mobile communication device.

3. The method of claim 2, wherein the contact center receives a telephone number of the mobile communication device for transferring the communication session from the kiosk to the mobile communication device.

4. The method of claim 1, wherein the code is received using one of: Near Field Communication (NFC), Bluetooth, or proximity based radio communications.

5. The method of claim 1, wherein the communication session is between the customer and an agent of the contact center, and when the communication session is transferred from the kiosk to the mobile communication device, a single communication record of the communication session is maintained in the contact center.

6. The method of claim 1, further comprising:
identifying that a user of the mobile communication device is a previous customer of the contact center; and
encrypting the transferred communication session using one or more encryption keys from a previous contact with the customer of the contact center.

7. The method of claim 1, wherein the communication session between the contact center and the kiosk comprises downloading a document to the kiosk and further comprising:
downloading the document for display on the mobile communication device in response to transferring the communication session from the kiosk to the mobile communication device.

8. The method of claim 1, wherein the communication session between the contact center and the kiosk is the video communication session with an agent of the contact center, wherein the code is provided based on an input from the agent of the contact center, and wherein the code is displayed as part of a video stream from the contact center that is displayed on the kiosk.

9. The method of claim 1, further comprising: in response to the code being associated with the specific type of product or service provided by the store, conferencing in an employee located in the store.

10. The method of claim 1, wherein a user of the mobile communication device can select a list of options associated with transferring the communication session from the kiosk to the mobile communication device comprising:
provide the map;
conferencing an employee located in the store; and
transferring a video communication session on the kiosk to an audio only communication session on the mobile communication device.

11. A system comprising:
a processor;
a communication manager, executed by the processor, that receives an indication that a customer has scanned a code on a kiosk that is one of: a Quick Response Code (QRCode), a bar code, a Radio Frequency Identifier (RFID), a scanned code, or a serial number, transfers a communication session, between an agent terminal of a contact center and the kiosk, from the kiosk to a mobile communication device in response to receiving the indication that the customer has scanned the code on the kiosk, determines that the code is associated with a specific type of product or service provided by a store and provides a map that identifies a location in the store where the customer can find the specific type of product or service in response to determining that the code is associated with the specific type of product or service provided by the store.

12. The system of claim 11, further comprising a kiosk module, executed by the processor, that determines if the mobile communication device needs to download a communication application and downloads the communication application on the mobile communication device in response to determining that the mobile communication device needs to download the communication application.

13. The system of claim 11, wherein the communication session between the contact center and the kiosk comprises downloading a document to the kiosk and wherein the communication manager downloads the document for display on the mobile communication device in response to transferring the communication session from the kiosk to the mobile communication device.

14. The system of claim 11, wherein the communication session between the contact center and the kiosk is the video communication session with an agent of the contact center, wherein the code is provided based on an input from the agent of the contact center, and wherein the code is displayed as part of a video stream from the contact center that is displayed on the kiosk.

15. The system of claim 11, in response to the code being associated with the specific type of product or service provided by the store, conferencing in an employee located in the store.

16. A tangible and non-transient computer readable medium having stored thereon instructions that cause a processor to execute a method, the method comprising:
instructions to receive an indication from a kiosk that a user of the kiosk wants to transfer a communication session, between an agent terminal of a contact center and the kiosk, from the kiosk to a mobile communication device;
instructions to receive an indication that a customer has scanned a code on the kiosk that is one of: a Quick Response Code (QRCode), a bar code, a Radio Frequency Identifier (RFID), a scanned code, or a serial number;
in response to receiving the indication that the customer has scanned the code on the kiosk, instructions to transfer the communication session from the kiosk to the mobile communication device;
instructions to determine that the code is associated with a specific type of product or service provided by a store; and
in response to determining that the code is associated with the specific type of product or service provided by the store, instructions to provide a map that identifies a location in the store where the customer can find the specific type of product or service.

17. The system of claim 11, wherein the contact center receives a telephone number of the mobile communication device for transferring the communication session from the kiosk to the mobile communication device.

18. The system of claim 11, wherein the code is received using one of: Near Field Communication (NFC), Bluetooth, or proximity based radio communications.

19. The system of claim 11, wherein the communication session is between the customer and an agent of the contact center and when the communication session is transferred from the kiosk to the mobile communication device, a single communication record of the communication session is maintained in the session manager.

20. The system of claim 11, wherein the session manager identifies that a user of the mobile communication device is a previous customer of the contact center and encrypts the transferred communication session using one or more encryption keys from a previous contact with the customer of the contact center.

* * * * *